Apr. 17, 1923.
W. AKEMANN
1,452,015
FIRE CONTROL APPARATUS ESPECIALLY FOR NAVAL GUNS
Filed Oct. 14, 1920
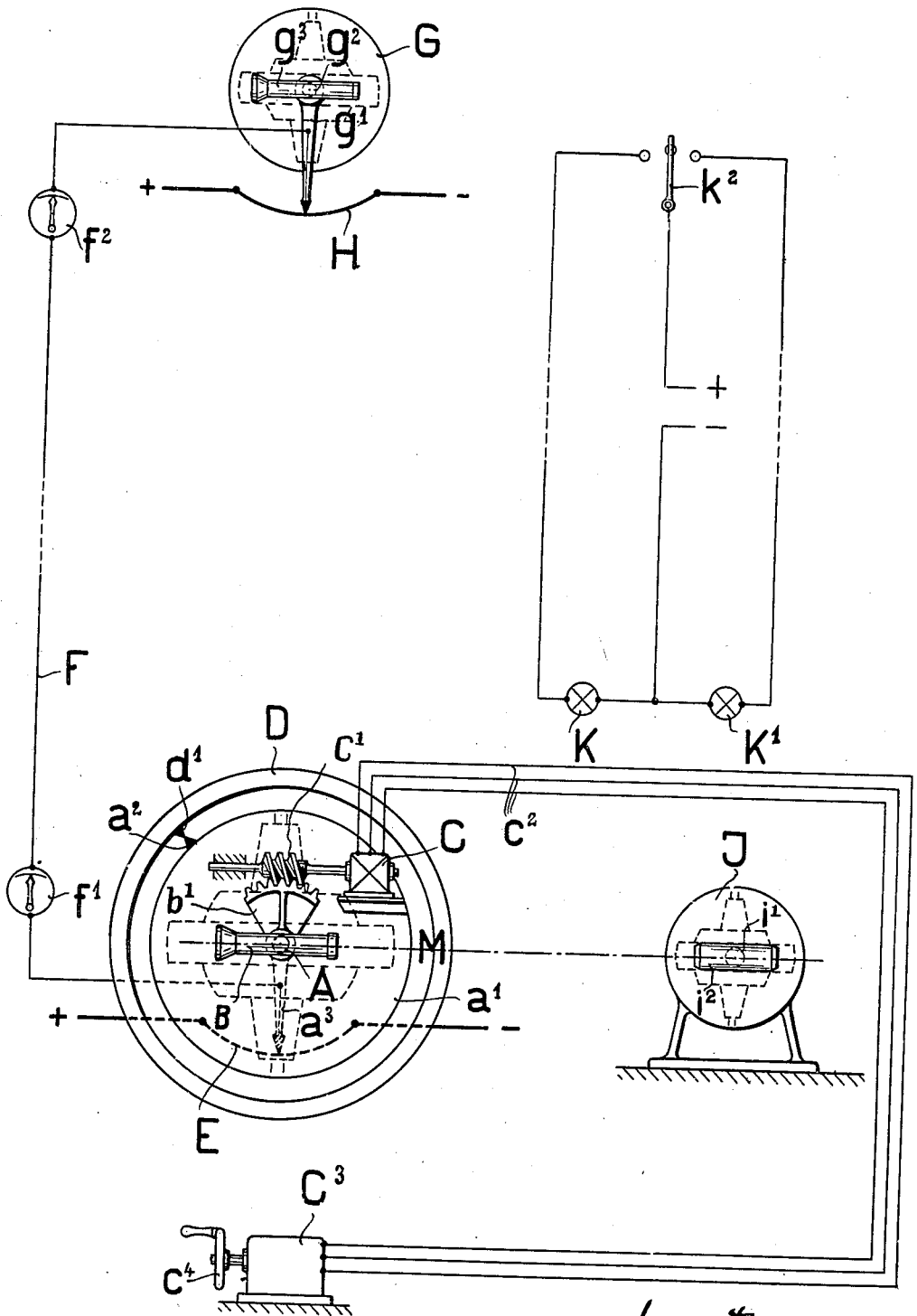
Inventor
Walther Akemann
By Knight Bros
Attys Patented Apr. 17, 1923.

1,452,015

UNITED STATES PATENT OFFICE.

WALTHER AKEMANN, OF ESSEN, GERMANY, ASSIGNOR TO FRIED. KRUPP AKTIEN-GESELLSCHAFT, OF ESSEN-ON-THE-RUHR, GERMANY.

FIRE-CONTROL APPARATUS ESPECIALLY FOR NAVAL GUNS.

Application filed October 14, 1920. Serial No. 417,040.

*To all whom it may concern:*

Be it known that I, Dr. WALTHER AKEMANN, residing at Essen, Germany, a citizen of the German Republic, have invented a certain new and useful Improvement in Fire-Control Apparatus Especially for Naval Guns, of which the following is a specification.

The present invention relates to a new and peculiar fire control apparatus intended especially for naval guns.

A diagrammatically represented embodiment of the invention is shown on the drawing.

Reference letter A denotes the stabilizable shaft or trunnion of a gyroscope M, hereafter called the "main gyroscope", placed inside the ship; preferably in the neighborhood of center of oscillation or pitching, and having its balance wheel (not shown) hung in a universal or Cardan joint. On the end of the shaft A, nearest to the spectator, is secured a circular disk $a'$. On the disk $a'$ is mounted to oscillate a sighting telescope B. The axis of oscillation of the telescope coincides with the axis of revolution of the shaft A. A worm wheel sector $b'$ is securely fastened to the sighting telescope B, and a worm $c'$, mounted in a bearing on the disk $a'$, is in mesh with the sector. A receiver C of an electric adjusting or setting device serves to rotate the worm $c'$, said receiver being similarly mounted on the disk $a'$, the setting device being connected through conductors $c^2$ with the transmitter $C^3$ belonging thereto, said transmitter being provided with a handwheel $c^4$, which is situated within reach of the operator using the telescope. On the disk $a'$ is also provided one contact point $a^2$ of a circuit closer; the other contact point $d'$ is to be found on a non-stabilizable part D of the gyroscope M. The contact points $a^2$ and $d'$ of the circuit closer are situated in a circuit, (not shown), belonging to the firing magnets of a gun, and form, therefore, an independent firing gear. The contact points are adjustable relatively to each other, and a firing angle corresponding to the firing implement.

On the end of the stabilizable shaft A away from the spectator is attached a downwardly pointing index finger $a^3$, the point of which slides on a circular resistance wire E and is constructed as a contact piece. The two ends of the resistance wire E are connected with the two poles of a direct current source. From the point of the index finger $a^3$, constructed as a contact piece, a conductor F leads to the point of another index finger $g'$, also constructed as a contact piece, which index finger $g'$ is secured on the stabilizable shaft $g^2$ of a gyroscope G, hereinafter called the "target gyroscope" and erected in an observation stand. On the shaft $g^2$ is still another sighting telescope $g^3$ secured, which is intended for directing against the target to be fired at. The point of the index finger $g'$ slides upon a circular resistance wire H similar to the resistance wire E. In the line of the conductor F are situated two indicator implements $f'$ and $f^2$, which are able to make deflections in one direction or the other in case of the presence of electric current in the conductor F. The one indicator implement $f'$ is situated in the place of the "main gyroscope" M, and the other indicator implement $f^2$ in the place of the "target gyroscope" G. The connection formed by the parts E F $f'$ $f^2$ H produces a Wheatstone bridge, in a branch of which are situated two indicator implemnts $f'$ and $f^2$, which make every deflection felt in the opposite position of the index fingers $a^3$ and $g'$, and also of the stabilizable shafts A and $g^2$.

Near the main gyroscope M is situated still another gyroscope J, hereinafter denoted as "auxiliary gyroscope", which is erected, together with the "main gyroscope", on a common plate (not shown) revoluble around an upright axis, a target glass $i^2$ being rigidly secured on its shaft $i'$. The auxiliary gyroscope J is constructed so that the sight line against the target obtained through this glass generally retains its horizontal direction relatively to the ground during operation. It is now so arranged that the sight line of the sighting telescope B of the "main gyroscope" coincides with that of the target glass $i^2$ of the auxiliary gyroscope, as long as these lines remain horizontal.

The observation stand is connected with the station of the two gryoscopes M and J by means of a signalling device. The latter consists of two signal lamps K and K', separately illuminated and situated in the station of the gyroscopes M and J, together with a switch $k^2$, by means of which either the one or the other of the lamps may be lit. The switch is located in the observation stand and is placed conveniently for the observer using the target telescope $g^3$.

In describing the operation of the present fire-control apparatus, it will now be supposed that the ship pitches and that all the parts of the apparatus take the position illustrated on the drawing, wherein the target telescope of the target gyroscope G in particular is directed against the target and the sighting telescope B of the main gyroscope M, as well as the target glass $i^2$ of the auxiliary gyroscope J, hold a direction which is parallel to that of the target telescope $g^3$; all this while the ship goes through the horizontal pitching.

In order now to retain continuously in the denoted angular position the stabilizable shaft A of the main gyroscope M, together with the stabilizable contact point $a^2$ of the independent firing device, even when the ship pitches, one proceeds as follows:

The operator at the observation stand observes the target visible on the cross-hair of the target telescope $g^3$, and by corresponding sideways pressure on one of the universal or Cardan joint rings, takes care that the target telescope $g^3$ secured upon the shaft $g^2$ retains continuously its angular position directed on the target. He simultaneously turns the switch $k^2$ into that position which lights the lamp K. The burning of the lamp K shows the operator of the main gyroscope M that the target telescope $g^3$ of the target gyroscope in the observation stand is directed against the target. In this case the operator of the main gyroscope must keep the angular position of the shaft A of the main gryoscope M to agree with the angular position of the stabilizable shaft $g^2$ of the target gyroscope G. Whether the angular positions of the two shafts $g^2$ and A agree or not will be shown by the position of the indexes of the indicating implement $f'$, because as long as the angular positions of the two shafts $g^2$ and A coincide, and consequently the points of the two index fingers $g'$ and $a^3$ stand in contact with exactly corresponding points of the resistance wires E and H, then the bridge branch F, containing the index fingers $f'$ and $f^2$, is without current, so that the indicators of the two indicating implements take the zero position shown on the drawing.

As soon, however, as any difference occurs between the angular positions of the shafts A and $g^2$, and, as a consequence, the point of the indicator finger $a^3$ lies on a different point of the resistance wire E to that of the index finger $g'$ in regard to the resistance wire H, then current flows through the bridge branch F and the indicators of the indicating implements $f'$ and $f^2$ deviate a corresponding amount. In this case the operator of the main gyroscope presses sideways upon one of the universal joint or Cardan rings of the main gyroscope until the index of the indicator implement $f'$ again reaches its zero position. As soon as this occurs the angular positions of shaft A and shaft $g^2$ coincide exactly, and the stabilizable contact point $a^2$ of the independent fire-control apparatus consequently takes a position which insures the firing at the correct moment. The direction of the sighting telescope B, connected with the shaft A through the self-locking gearing $c'$ $b'$, then also agrees with the direction of the telescope $g^3$.

While this takes place, the auxiliary gyroscope J is also in operation, and its shaft $i'$ is so proportioned that a direction given it, as, for instance, the sighting line of the target glass $i^2$, is generally not altered from its original horizontal direction as regards the original telescope sighting ground. As the original telescope sighting lines of the telescope B and the target glass $i^2$ fall in a line and also are parallel with the sight line of the target telescope $g^3$, and as the parallelism of the sight lines of the telescope $g^3$ and B in this manner is retained, then even during the pitching movement of the ship the parallelism of the sight lines of the target glass $i^2$ and the telescope B is also in general maintained.

The greatest distance between the parallel sight lines of the telescope B and the target glass $i^2$, caused by the pitching movement of the ship, is now so small that the image of the target in the target glass $i^2$ does not come outside the field of the telescope B, because the position of the two gyroscopes M and J is in the neighborhood of the pitching center. The target image, visible without limit in the target glass $i^2$, then appears simultaneously in the intersection of the cross-hairs of the telescope B for the observer looking through the telescope B during the described occurrence, even with pitching movement of the ship. A disappearance of the target image of the target glass $i^2$ from the field of vision of the telescope B will only occur—and this very exceptionally—when the parallelism of the sight line of the target glass $i^2$ and the telescope B has been lost through a swinging of the sight line of the target glass $i^2$.

In such a case the operator of the main gyroscope M turns the hand wheel $c^4$ until the target image of the target glass $i^2$ again appears at the intersection of the cross-hairs of the telescope B. As soon as this is the case, the sight line of the target glass $i^2$ is again parallel with that of the sighting telescope B, which is connected with the hand wheel $c^4$ through the adjusting device $C^3$ $c^2$ C and the self-locking gearing $c'$ $b'$. No change takes place in the angular position of the shaft A and the contact point $a^2$ of the independent fire-control apparatus through the displacement of the sighting telescope B by means of the hand-wheel $c^4$. As a general rule, however, a displacement of the sighting telescope B by means of the hand wheel $c^4$ is unnecessary, because the auxiliary gyroscope J is constructed so that the sight line of the target glass $i^2$ retains its original horizontal position.

Should the target be concealed, by smoke or mist, for instance, and for that reason it is no longer possible to hold the sight line of the target telescope $g^3$ directed on the target, then the operator of the target gyroscope G turns the switch $k^2$, thereby putting out the lamp K and lighting the other lamp K'. This shows the operator of the main gyroscope M that the target is invisible from the stand of the target gyroscope G and that as a consequence the setting of the main gyroscope no longer can be accomplished from the indications of the indicator implement $f'$. From this moment the angular position of the shaft A of the main gyroscope M will coincide with that of shaft $i'$ of the auxiliary gyroscope J, wherefore it will be supposed that the direction which has been given to the latter does not change its angular position in relation to the ground, even with prolonged concealment of the target. The coinciding of the angular positions of the two shafts A and $i'$ will then be retained in the following manner, namely, that the operator during the concealment of the target, continuously observes through the telescope B the infinitely visible target image of the target glass, and that he takes care, when necessary, by pressing sideways upon one universal joint ring (Cardan-ring) of the main gyroscope, that the target image of the target glass $i^2$ does not disappear from the intersection of the cross-hairs in the sighting telescope.

As long as the target is invisible the angular position of the shaft $g^2$ of the target gyroscope G is, however, also kept in coincidence with the angular position of the shaft A of the main gyroscope M, and consequently also with the angular position of the shaft $i'$ of the auxiliary gyroscope J as being parallel with the former; all this being accomplished by observing the indicator implement $f^2$ and the subsequent pressing upon one of the Cardan-rings of the gyroscope.

As it now may be supposed of the auxiliary gyroscope J that even during a lengthy concealment of the target the direction given the shaft $i'$ does not change relatively to the ground, then the shafts A and $g^2$ will also retain during this time an angular position, by which the sight lines given the telescopes B and $g^3$ do not change their direction with regard to the ground. As, however, the direction of the telescope $g^3$ at the moment of the target's disappearance, pointed towards the target, it will also remain directed against the target during the latter's disappearance. When subsequently the target again becomes visible after the smoke or mist has disappeared, as a general rule the target will again be seen on the cross-hair of the target telescope $g^3$. Should not this be the case, which, however, very rarely occurs, it will mean that the shaft $i'$ of the auxiliary gyroscope has not completely retained its original angular position during the waiting, that position, namely, wherein the sight line of the target glass $i^2$ lays horizontally relatively to the ground. In that case the switch $k^2$ is first brought back into the position which causes the lighting of the lamp K, and thereupon the target telescope $g^3$ of the target gyroscope G is again directed against the target and kept in the direction against the target. Now, the main gyroscope is re-adjusted in accordance with the indications of the indicator implement $f'$, and lastly, the setting of the auxiliary gyroscope J is corrected in accordance with the setting of the main gyroscope, so that its adjusted direction with regard to the ground again becomes horizontal.

The fire-control apparatus forming the subject matter of the present invention provides, consequently, the possibility of keeping the angular position of the stabilizable shaft of a main gyroscope in agreement with either the angular position of the stabilizable shaft of a target gyroscope intended for intersecting the target, or with the angular position of an auxiliary gyroscope; the auxiliary gyroscope then being so constructed that a direction given its stabilizable shaft generally does not change as regards the ground.

Through this new fire-control apparatus the important technical advantage is attained, that the desired angular position of the stabilizable shaft of the main gyroscope can be retained with greatest probability, independent of whether the target remains visible or not. The fact that an indicator implement has been provided at the station of the target gyroscope for deviations in the angular position of the stabilizable shafts of main—and target—gyroscopes, offers an advantageous possibility to guard the working of the auxiliary gyroscope. The arrangement of the telescope of the main gyroscope for swinging it in relation to the stabilizable shaft, makes it possible to avoid the influence of any deviation in angular position of the stabilizable shaft of the auxilary gyroscope. The use of an electric adjusting device for setting the telescope then provides the possibility of avoiding the occurrence of the undesirable turning moments on the stabilizable shaft of the main gyroscope.

Without changing the scope of the invention, it would be possible to insert a "Wheatstone bridge" between the main gyroscope and the auxiliary gyroscope, said bridge corresponding to the bridge formed by the parts $a^3$ E F $f'$ $g'$ H, and this permits of discovering any deviation in the angular position of the stabilizable shafts of the main gyroscope and the auxiliary gyroscope. It would in this latter case be necessary to rigidly connect the index which belongs to the Wheatstone bridge and is placed adjacent to the main gyroscope, with the toothed sector $b'$, while the index belonging to the auxiliary gyroscope is secured to the stabilizable shaft. The sighting telescope of the auxiliary gyroscope and the target glass then become unnecessary.

Claims—

1. A fire control apparatus for naval guns comprising a main gyroscope, a target gyroscope, a sighting device stabilized by said target gyroscope, an auxiliary gyroscope adapted to maintain a determined direction in relation to the ground, electrical indicating means connecting said main gyroscope with said target gyroscope whereby the angular position of said two gyroscopes may be caused to coincide and means carried by said main gyroscope and said auxiliary gyroscope for determining the coincidence of said last two gyroscopes.

2. A fire control apparatus of the class described comprising a main gyroscope, a pair of firing tongues supported thereby, one of said firing tongues being stabilized, a sighting telescope carried by and stabilized by said main gyroscope, a target gyroscope, a target telescope stabilized thereby, electrical indicating means connecting said two gyroscopes for indicating the difference in the angular positions of said telescopes carried thereby, an auxiliary gyroscope adapted to maintain a determined direction in relation to the ground and means carried by said auxiliary gyroscope and cooperating with the sighting telescope of said main gyroscope for determining the relative angular position of said main gyroscope to said auxiliary gyroscope.

3. A fire control apparatus of the class described comprising a main gyroscope, a target gyroscope, a sighting device stabilized by said target gyroscope and intended for intersecting the target, an electric indicating device connecting said main gyroscope with said target gyroscope whereby deviations of the angular position of the two gyroscopes will be indicated at the main gyroscope, a shaft stabilized by the main gyroscope, a sighting telescope carried thereby and adjustable relatively thereto, an auxiliary gyroscope and means stabilized by said auxiliary gyroscope and cooperating with said last mentioned sighting telescope whereby the coincidence of the angularly position of the main gyroscope with the auxiliary gyroscope may be determined.

4. A fire control apparatus of the class described comprising a main gyroscope, a target gyroscope, a sighting device stabilized by said target gyroscope and intended for intersecting the target, an electric indicating device connecting said main gyroscope with said target gyroscope whereby deviations of the angular positions of the two gyroscopes will be indicated at the main gyroscope, a shaft stabilized by the main gyroscope, a sighting telescope carried thereby and adjustable relatively thereto, an auxiliary gyroscope, a sighting line device carried by said auxiliary gyroscope and stabilized thereby, said auxiliary gyroscope being adapted to maintain a determined direction in relation to the ground, said sighting line device cooperating with the sighting telescope of the main gyroscope for establishing a parallel sighting line for the main gyroscope sighting telescope.

5. A fire control apparatus of the class described comprising a main gyroscope, a target gyroscope, a target telescope stabilized thereby, each of said gyroscopes having a stabilized shaft, a Wheatstone-bridge connection between said gyroscopes whereby deviations of the angular position of the two stabilizable shafts may be indicated at the main gyroscope, a member carried by the stabilized shaft of said main gyroscope, a sighting telescope supported thereon, an electrical transmission means embodying a transmitter and receiver for adjusting said sighting telescope relatively to said member, and an auxiliary gyroscope provided with a stabilized target glass for cooperating with the sighting telescope of said main gyroscope whereby the sighting line of the telescope of the main gyroscope may be made parallel with the sight line established by the target glass of the auxiliary gyroscope.

6. A fire control apparatus of the class described comprising a main gyroscope, a sighting telescope stabilized thereby, firing tongues carried by said main gyroscope and included in a firing circuit, a target gyroscope, a target telescope stabilizable thereby, electrical indicating means for indicating at the main gyroscope deviations of the angular position of the two gyroscopes, an auxiliary gyroscope, a target glass stabilizable thereby, said target glass establishing a sighting line in a determined direction in relation to the ground and for the sighting telescope of said main gyroscope.

7. A fire control apparatus for naval guns comprising a main gyroscope, a pair of firing tongues carried thereby, one of which is stabilized, said firing tongues being included in a firing circuit, a target gyroscope, a sighting telescope stabilized thereby, a Wheatstone-bridge containing two indicators connecting said main gyroscope to said target gyroscope whereby deviations of the angular position of the two gyroscopes may be indicated, one of said indicators being disposed adjacent the target gyroscope, a sighting device stabilized by said main gyroscope and adjustable relatively thereto, an auxiliary gyroscope maintaining a determined direction in relation to the ground, a sighting device carried by said auxiliary gyroscope, and enabling the sighting telescope of the main gyroscope to be adjusted parallel with the direction established by the auxiliary gyroscope.

The foregoing specification signed at Essen, Germany, this 17th day of June, 1920.

Dr. WALTHER AKEMANN.

In presence of—
HANS GOTTSMANN,
JOHANN DECKERS.